Patented May 29, 1951

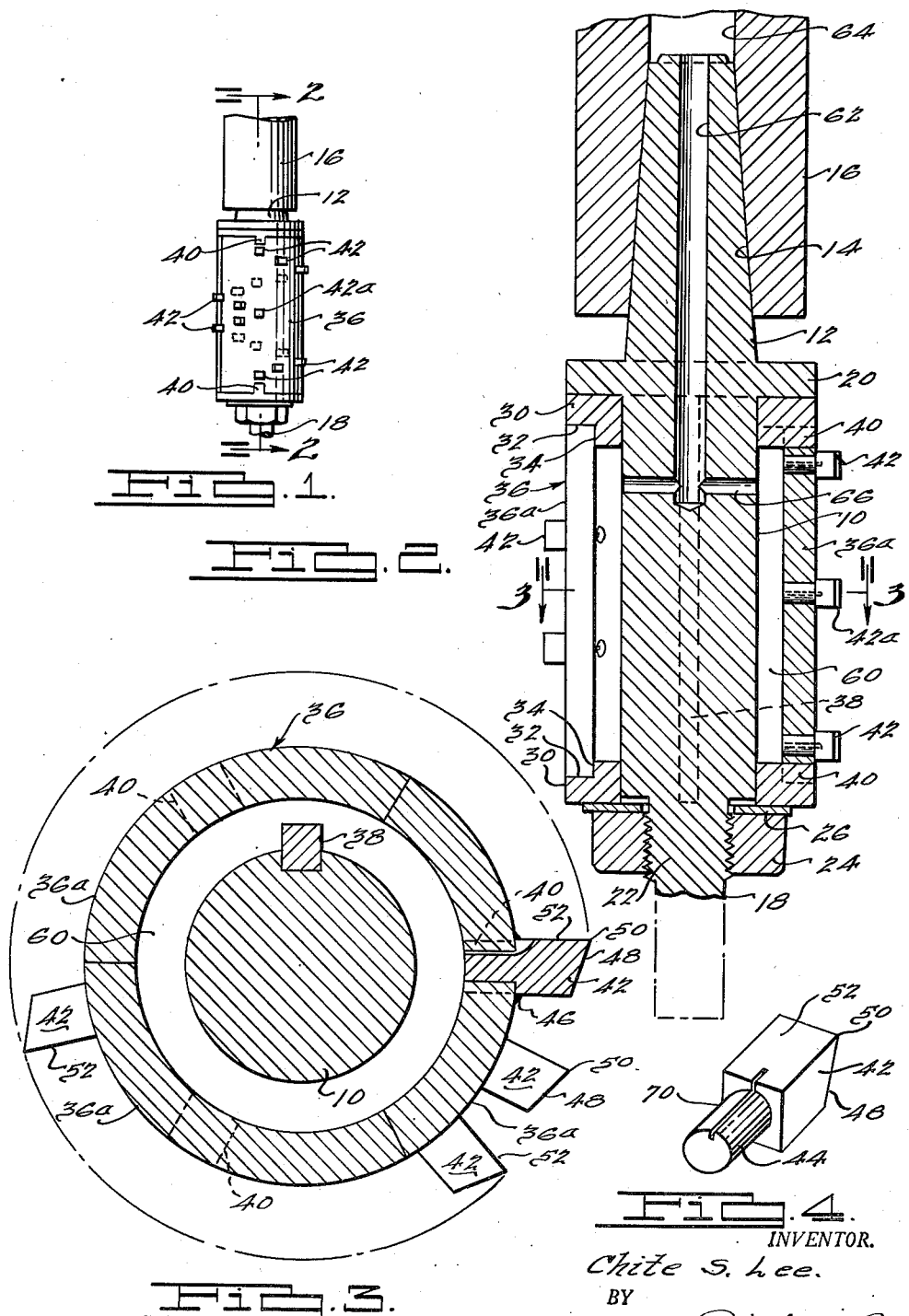

2,554,783

UNITED STATES PATENT OFFICE 2,554,783

CUTTING TOOL

Chite S. Lee, Detroit, Mich.

Application May 28, 1945, Serial No. 596,289

2 Claims. (Cl. 29—106)

This invention relates to cutting tools and particularly to cutting tools of the milling cutter type, the principal object being the provision of a tool of this type of new and novel conformation.

Objects of the invention include the provision of a cutting tool comprising a supporting element and a tooth supporting shell of cylindrical conformation mounted thereon and formed of a plurality of segments; the provision of a construction as above described in which the cutting tooth carrying shell is spaced from the member supporting it thereby to form an annular chamber between it and its supporting member and the shell is provided with openings leading to the cutting faces of the teeth; the provision of a cutting tool of the type described in which the supporting member is provided with passages for the introduction of a liquid into the annular chamber; the provision of a tool as above described in which the shell is provided with openings therein leading from the chamber to the cutting faces of the teeth, such openings being of such size that the liquid in the chamber will not flow therethrough to a material extent except under the effects of centrifugal force when the tool is rotating; the provision of a tool of the type described in which the openings leading from the chamber to the cutting face of the teeth are formed in a new and novel manner; and the provision of a tool of the type described having a novel arrangement of cutting teeth thereon.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is a side elevational view of my improved cutting tool, illustrating the same as being mounted in the vertically directed spindle of a milling machine;

Fig. 2 is an enlarged, diametrical sectional view taken on the line 2—2 of Fig. 1;

Fig. 3 is an enlarged transverse sectional view taken on the line 3—3 of Fig. 2; and, Fig. 4 is an enlarged perspective view of one of the cutting teeth for the tool shown in the preceding figures before being applied thereto.

The tool of the present invention relates particularly to that type of cutting tool employed for slab milling operations or the like. To that end it includes a cylindrical body portion 10 provided with the usual tapered shank 12 at one end thereof which is adapted to be received in the tapered hole 14 of the spindle 16 of a milling machine or like machine tool. The end of the body 10 opposite the shank 12 may or may not be provided with an extended concentric cylindrical portion such as 18 depending upon whether it is desired to provide the tool with an outboard bearing or not.

At the point of junction of the main body portion 10 with the tapered shank 12 an integrally formed annular flange 20 is provided. The opposite end of the body 10 is reduced and threaded as at 22 in order to receive a nut such as 24 which, in cooperation with a washer 26, provides with the flange 20 a pair of surfaces spaced axially of the main body portion 10 and disposed with their planes perpendicular to the axis of the body 10.

A pair of ring members or collars 30, each provided with a bore closely fitting the body 10 are received thereon, one against the flange 20 and one against the washer 26. The rings or collars 30 are each stepped to provide an axially facing surface 32 and a radially facing concentric surface 34, and the collars or rings 30 are mounted on the main body portion 10 so that the surfaces 32 are in axially opposed relation with respect to each other, as shown. Received between the opposed surfaces 32 and against the surfaces 34 of both ring or collar members 30 is a cylindrical shell indicated generally at 36. It is clamped axially in position between the ring or collar members 30 by means of the nut 24 acting through the washer 26 and is centered on the surfaces 34.

The shell 36 in accordance with the present invention is made up of two or more cylindrical segments, three such segments indicated at 36a being employed in the particular construction shown by way of illustration. It will be noted that the abutting edges of the segments 36a are flat and lie in planes radial to the axis of the body 10, and the three segments 36a cooperating to form a complete and solid cylindrical shell.

In order to provide for driving movement between the body 10 and the shell 36 independently of the clamping action of the nut 24, a key 38 is provided between the main body portion 10 and both rings or collars 30. Additionally, each ring or collar 30 is formed to provide three keys 40 equally angularly spaced with respect to each other about the axis of the corresponding ring or collar member 30 and within the step formed by the surfaces 32 and 34 thereof. Opposite ends of each segment 36a are notched out, preferably midway between the opposite side edges thereof, for close and complete reception of corresponding keys 40, as shown. Thus each segment 36a is keyed at each end thereof by means of a key 40 to both of the ring or collar members 30 and the collar members 30 are in turn keyed to the main body portion 10 by means of the key 38.

A plurality of cutting teeth 42 are mounted on the sleeve 36 and project generally radially therefrom. In the particular construction shown and as brought out best in Fig. 4 each tooth 42 is preferably formed from square stock one end of which is turned to provide a cylindrical shank 44. The shell 36 at each point thereon at which it is desired to locate a tooth 42 is provided with a generally radially directed hole therethrough in which the shank 44 of the corresponding tooth 42 is received, preferably in closely fitting and preferably press-fitted relation. Additionally in order to more securely fix each tooth 42 to the shell 36 it is preferable to silver solder, braze or weld each tooth 42 to the shell 36 as at 46.

It will, of course, be appreciated that whether the holes in the shell 36 which receive the shanks 44 of the teeth 42 are disposed radially or not will depend upon whether it is desired to give the teeth 42 a positive rake or a negative rake, and the particular angle of rake in each case, the holes for the shanks 44 being drilled through the shell 36 in a direction to conform in any particular instance. It will be understood that where the teeth 42 are made from square stock as described, then the outer end of each tooth 42 is ground away as at 48 to provide a cutting edge 50 therefor and clearance or relief for such edge 50. All of the teeth 50 are, of course, so positioned on the shell 36 that the cutting faces 52 thereof are all directed in the same direction circumferentially of the tool.

In accordance with one phase of the present invention the teeth 42 are arranged in two groups upon the shell 36, each group in the particular case shown including a single tooth indicated at 42a and positioned midway the length of the sleeve 36, and the teeth of each group follow a helix extending from the tooth 42a, turning in the same direction about the axis of the tool but extending in axially opposite directions from the tooth 42a. Each group, as shown, extends for substantially a complete revolution about the axis of the tool, and in the particular case shown the last tooth of each group is axially aligned with the tooth 42a as brought out in Figs. 1 and 2 so that each of the groups of teeth makes one complete revolution about the body of the tool. The teeth 42 are of such width and number that the cutting edge of each tooth axially overlaps the cutting edges of the next adjacent teeth so that all of the teeth 42 collectively provide cutting edges substantially the full length of the shell 36. By arranging the cutting teeth in this manner a minimum number of teeth come into engagement with the work at any one time so that a minimum amount of power is required to rotate the tool and the opposed helical arrangement of the teeth offset any axial forces which might otherwise be present due to cutting action between the teeth and the work.

In accordance with another phase of the invention means are provided for introducing a cutting compound or an oil to the chamber 60 which is formed between the shell 36 and the main body 10 between the ring or collar members 30, and means are also provided for discharging such cutting compound or oil to the cutting edges of the teeth 42 during operation. To introduce the cutting compound or oil into the chamber 60 an axial opening 62 extends from the axially outer, or upper end of the shank 12 in the arrangement shown, where it is in open communication with the bore 64 of the spindle 16, to a point in the body 10 within the axial length of the chamber 60 where one or more cross-openings 66 provide communication between it and the chamber 60. Thus the cutting compound or oil may be fed down through the bore 64 of the spindle 16 and through the passages 62 and 66 to the chamber 60. Preferably for reasons which will hereinafter be apparent such feed is by gravity and preferably at a low head.

In accordance with the present invention an opening is provided through the shell 36 communicating the cutting face 52 of each cutting tooth 42 with the chamber 60. Contrary to somewhat similar constructions heretofore proposed, these last-mentioned openings are of very small size. In fact they are so small that the surface tension of the cutting compound or oil in the openings is sufficient, under the particular head of pressure employed and when the tool is not rotating, to prevent, or substantially prevent, the cutting compound or oil from flowing out of the chamber 60 through such openings, but when the tool is rotated the centrifugal force acting upon the cutting compound or oil in the chamber 60 and in such passages or openings will be sufficient to overcome the described surface tension and cause the cutting compound or oil to be discharged through such openings in a fine, small stream upon the cutting faces 52 of the cutting teeth 42.

In the broader aspects of the invention the openings through the shell 36 leading from the chamber 60 to the cutting face 52 of each tooth 42 may be formed or provided in any suitable manner. However, and particularly because of the difficulty in drilling such small size holes, in accordance with a narrower phase of the present invention such passages are formed in a specific manner as particularly brought out in Fig. 4.

In other words, they are formed by a groove 70, shown in exaggerated size, which is milled or otherwise cut in the surface of the shank 44 of each tooth 42 in axially parallel relation to such shank and centrally of the cutting face 52 of such tooth. The grooves 70 extend from the inner end of each shank 44 into the cutting face 52 of each tooth 42 so as to be exposed on the outside of the tool. The groove thus formed is, of course, preferably small enough as above described to prevent the free discharge of cutting compound or oil therethrough when the tool is not rotating. Obviously when the shank 44 of each tooth 42 is pressed into the shell 36 the bore of the hole in the shell which receives the shank serves to complete the opening thus provided by the groove 70 over the length of the shank 44 and/or thickness of the shell 36, depending upon which one is of the smallest dimension. When the teeth 42 are brazed to the shell 36 then, of course, care must be taken so that the brazing or the like 46 will not plug the groove 70 at the point where it opens onto the outer face of the shell 36.

It will be appreciated, of course, that by making the shell 36 in the segments 36a it permits the inner ends of the grooves 70 to be inspected in manufacture and permits the removal of any obstructions at their inner ends which might otherwise render them inoperative. It will also be appreciated that where necessary a suitable sealing element or compound may be interposed between the abutting faces of the segment 36a, and between the end faces thereof and the ring or collar members 30 to seal these joints against leakage of cutting compound or oil from the chamber 60.

It has been found that with the construction as last described and with a relatively low head of cutting compound or lubricant in the chamber 60, when the tool is stationary very little if any of the cutting compound or oil leaks through the grooves 70, but as soon as the tool is rotated in operation the centrifugal force causes such cutting compound or oil to be fed out through the grooves 70 in a fine stream to the cutting edges 50 of the teeth 42, not only cooling the teeth with a minimum flow of cutting compound or oil but providing the necessary lubrication for the cutting edges thereof during engagement with the work.

Having thus described my invention, what I claim by Letters Patent is:

1. In a cutting tool of the character described, in combination, a shell having a generally radially directed opening therethrough, a cutting tooth, and a circularly sectioned shank on said cutting tool received in said opening, said shank having a groove formed in the outer surface thereof and said groove extending from the free end of said shank into said tooth, said shank being closely received within said opening whereby said groove forms a passage between the inner face of said shell and the cutting face of said tooth.

2. In a cutting tool of the character described, in combination, a shell having a generally radially directed opening therethrough, a cutting tooth, a circularly sectioned shank on said cutting tool received in said opening, said shank having a groove formed in the outer surface thereof and said groove extending from the free end of said shank into said tooth, said shank being closely received within said opening whereby said groove forms a passage between the inner face of said shell and the cutting face of said tooth, and means fused to both said tooth and said shell fixing said tooth with respect to said shell.

CHITE S. LEE.

REFERENCES CITED

The following references are of record in the file of this patent:

UNITED STATES PATENTS

| Number | Name | Date |
| --- | --- | --- |
| 582,081 | Newton | May 4, 1897 |
| 960,526 | Erlandsen | June 7, 1910 |
| 1,071,615 | Gilford | Aug. 26, 1913 |
| 1,855,511 | Edgar | Apr. 26, 1932 |
| 2,021,188 | Lovejoy | Nov. 19, 1935 |
| 2,080,401 | Heard | May 18, 1937 |

FOREIGN PATENTS

| Number | Country | Date |
| --- | --- | --- |
| 13,441 | Great Britain | July 23, 1892 |
| 144,652 | Germany | Oct. 2, 1903 |